United States Patent [19]

Rumpel

[11] Patent Number: 4,714,270
[45] Date of Patent: Dec. 22, 1987

[54] INDEPENDENT WHEEL SUSPENSION WITH TOE CORRECTING LINK

[75] Inventor: Manfred Rumpel, Birmingham, Mich.

[73] Assignee: Ford Motor Company, Dearborn, Mich.

[21] Appl. No.: 789,229

[22] Filed: Oct. 18, 1985

[51] Int. Cl.⁴ .................................................. B60G 5/00
[52] U.S. Cl. ...................................... 280/690; 280/701
[58] Field of Search ................................ 280/701, 690

[56] References Cited

U.S. PATENT DOCUMENTS

| | | | |
|---|---|---|---|
| 3,111,307 | 7/1963 | Cuskie | 267/20 |
| 3,178,202 | 2/1965 | Kozicki | 280/696 |
| 3,202,237 | 4/1965 | Dreisziger | 180/73 |
| 3,893,701 | 10/1975 | Kroniger | 280/690 |
| 4,181,322 | 8/1980 | Kroniger | 280/699 |
| 4,245,853 | 8/1981 | Inoue et al. | 280/701 |
| 4,269,432 | 4/1981 | Inoue et al. | 280/690 |
| 4,400,008 | 7/1983 | Rumpel | 280/701 |
| 4,444,415 | 4/1984 | von der Ohe | 280/701 |
| 4,456,282 | 7/1984 | Rumpel | 280/690 |
| 4,457,536 | 6/1984 | Rumpel | 280/663 |
| 4,462,609 | 8/1984 | von der Ohe | 280/690 |
| 4,491,341 | 10/1985 | Maebayashi | 280/688 |
| 4,511,160 | 6/1985 | Inoue | 280/701 |
| 4,515,391 | 2/1985 | Koide | 280/690 |
| 4,519,627 | 5/1985 | Shibahata et al. | 280/701 |
| 4,529,221 | 7/1985 | Kijima et al. | 280/701 |
| 4,529,222 | 10/1985 | Kijima et al. | 280/701 |
| 4,529,223 | 3/1985 | Maebayashi et al. | 280/701 |
| 4,530,513 | 4/1985 | Kijima et al. | 280/701 |
| 4,530,514 | 7/1985 | Ito | 280/701 |
| 4,536,007 | 6/1985 | Kijima et al. | 280/701 |
| 4,537,420 | 5/1985 | Ito et al. | 280/690 |

FOREIGN PATENT DOCUMENTS

| | | | |
|---|---|---|---|
| 70025 | 1/1983 | European Pat. Off. | 280/701 |
| 2729962 | 1/1979 | Fed. Rep. of Germany | 280/690 |
| 2818198 | 10/1979 | Fed. Rep. of Germany | 280/690 |
| 3139792 | 4/1983 | Fed. Rep. of Germany | 280/701 |
| 57-51507 | 4/1982 | Japan . | |
| 139807 | 8/1983 | Japan | 280/701 |

OTHER PUBLICATIONS

Automobiltechnische Zeitschrift 84N1 (1982) 7/8.

*Primary Examiner*—John J. Love
*Assistant Examiner*—Ross Weaver
*Attorney, Agent, or Firm*—Jerome R. Drouillard; Roger L. May

[57] ABSTRACT

An independent wheel suspension for a vehicle is suitable for use with either driven or non-driven wheels and includes a lower control arm and toe correcting link which urges the control arm and its associated wheel carrier in the direction of toe in during wheel recession.

16 Claims, 6 Drawing Figures

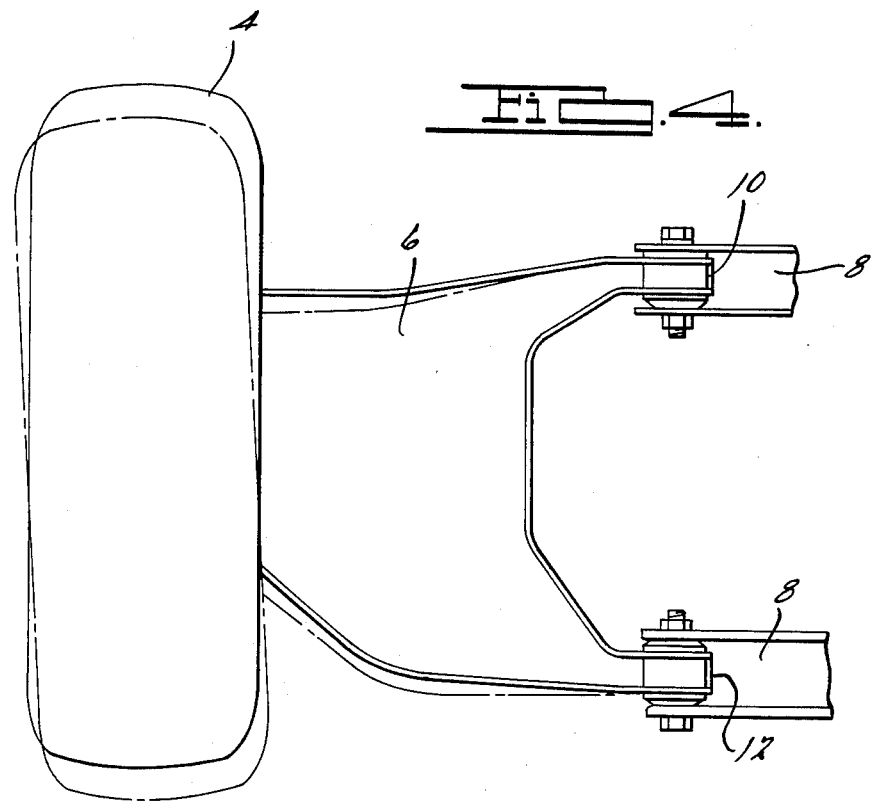
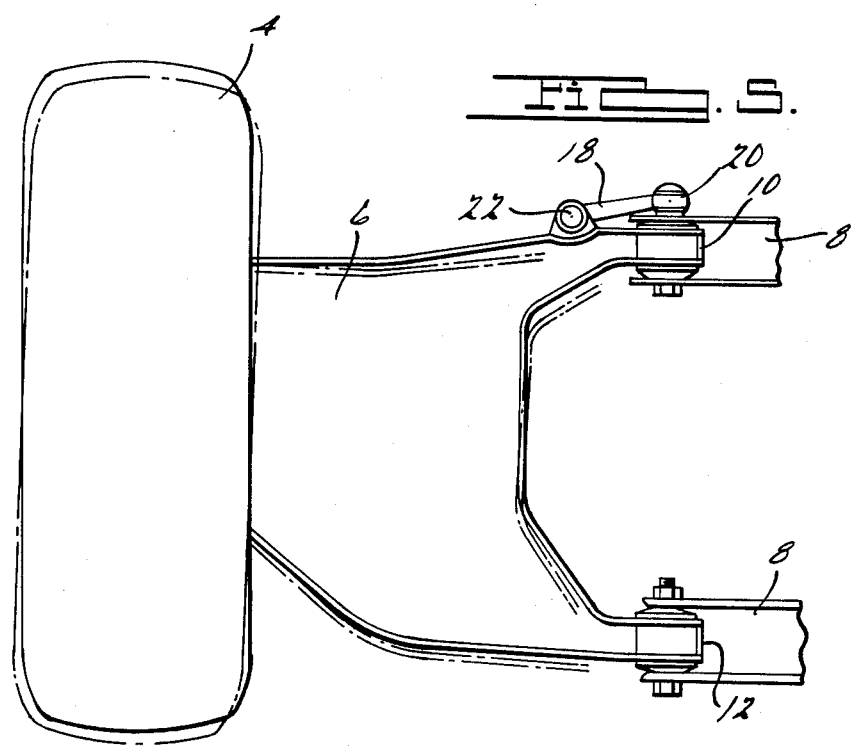

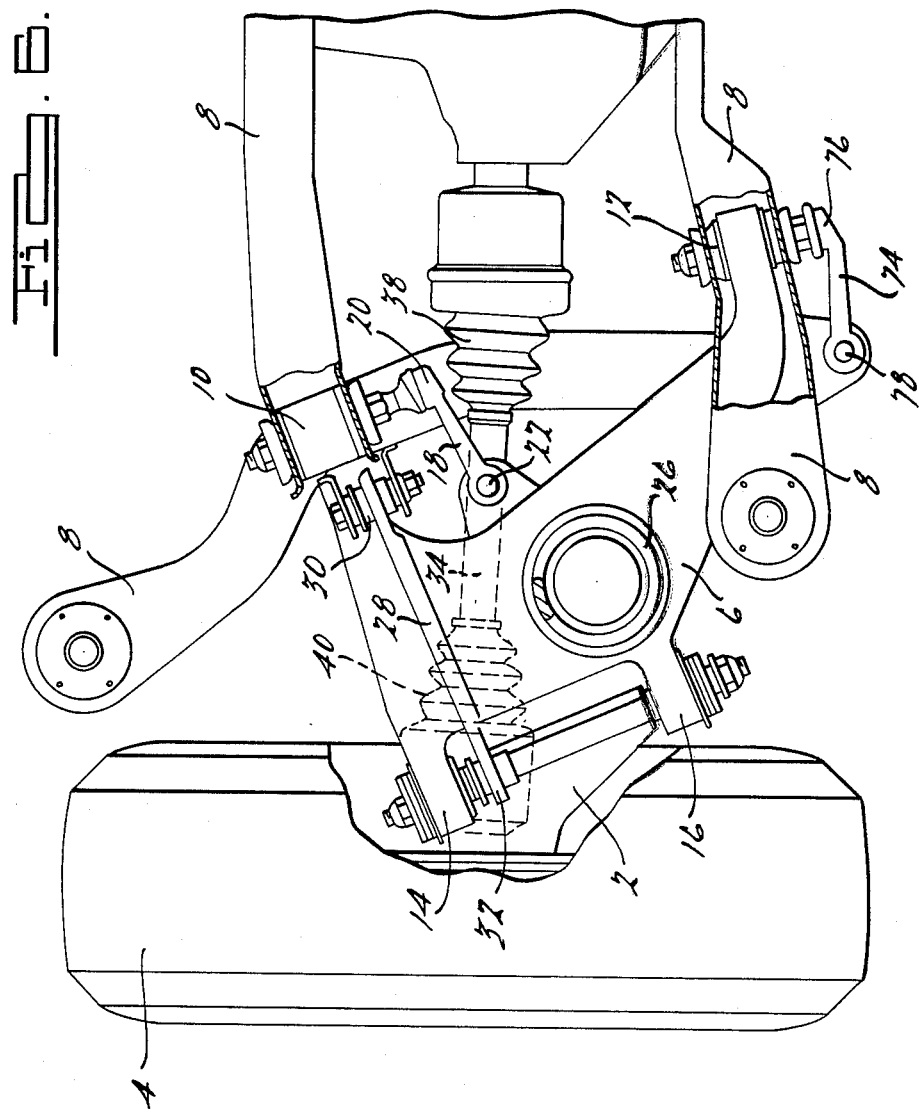

INDEPENDENT WHEEL SUSPENSION WITH TOE CORRECTING LINK

BACKGROUND OF THE INVENTION

Field of the Invention

This invention relates to an independent wheel suspension with a toe correcting link.

Disclosure Information

The three principal attitude measurements of vehicle road wheels are caster, camber, and toe. This invention is concerned with the control of toe angle during braking, and off throttle operation. Vehicles equipped with solid beam type rear drive axles do not present designers with any particular difficulty in terms of the need to control the toe angle of the rear driving wheels during various vehicle operating modes. With the advent, however, of independent rear suspensions for driving wheels, the need has arisen for controlling toe angle so as to provide safe operation of vehicles equipped with independent suspensions because it is well known that if uncontrolled, or under controlled, rear wheel toe angle may cause steering to be unpredictable.

Automotive designers have attempted a number of solutions for the problems posed by the need to control toe during various vehicle operating modes. U.S. Pat. No. 3,893,701 discloses an independent suspension in which one guide arm consisting of a leaf spring elastically allows toe in during cornering. The elastic guide arm is further said to prevent toe changes during braking and acceleration. This system is not susceptible to simple adjustment of the toe control, however, because the leaf spring element must be changed to accomplish any adjustment.

U.S. Pat. No. 4,491,341 discloses an independent rear suspension having a semi-trailing arm and MacPherson strut with toe control provided by a transversely extending control rod. This system is said to produce toe in during turning movements and deceleration of the vehicle.

U.S. Pat. No. 4,457,536 discloses an independent rear wheel suspension for a motor vehicle in which the toe angle of a wheel carrier attached to a first laterally extending control arm is controlled during jounce and recession by means of a second laterally extending control arm mounted rearwardly of the first arm.

U.S. Pat. No. 4,456,282 discloses an independent rear wheel suspension for a front drive vehicle in which the toe angle of the wheel carrier is controlled during recession by a trailing arm having an inwardly angled attachment at its leading end.

U.S. Pat. No. 4,462,609 discloses an independent suspension for rear drive vehicle including upper and lower wishbone-shaped control arms and a generally transverse track rod. This system translates limited rotation of the wheel carrier about the roadwheel's rotational axis into toe-in during braking as well as other vehicle operating modes. It has been found, however, that this configuration is particularly sensitive to changes in location of the pivot points of the upper control arm with respect to the pivot points of the lower control arm. This sensitivity could present problems during mass production of a vehicle having this suspension.

U.S. Pat. No. 3,202,237 discloses an independent suspension which will produce toe in during jounce movement of the wheel assembly but will allow toe out during braking and throttle-off operation.

U.S. Pat. No. 4,181,322 discloses an independent rear suspension having a rear guide rod arm comprising a leaf spring extending generally transversely of the vehicle and a longitudinal strut member elastically supported on a rotating shaft by means of an elastic bushing interposed between a sleeve carried upon the longitudinal strut member and the rotating bearing shaft. This arrangement is said to control wheel camber changes during braking and acceleration.

U.S. Pat. No. 3,111,307 discloses a semi-trailing arm independent suspension in which a lower control arm is mounted with the roller cam at its leading end, which allows recession in the event that the road wheel strikes an obstruction. There is no suggestion that movement of the lower control arm affects the toe angle of the wheel carrier or road wheel.

U.S. Pats. Nos. 4,245,853 and 4,269,432 discloses an independent wheel suspension in which separate front and rear control arms individually pivoted to a wheel carrier produce toe in during wheel recession.

U.S. Pat. No. 4,478,430 discloses a turnable arm suspension system which produces toe in during suspension jounce, but which would likely exhibit toe-out during wheel recession.

Finally, as shown in Automobiltechnische Zeitschrift 84 (1982) 7/8, BMW automobile models 733i/528i use a screw-motion, semi-trailing arm rear axle having a auxiliary linkage between the outboard mounting of the trailing arm and the chassis which produces toe in by manipulating the trailing arm during jounce and rebound motion of the suspension but not during recession.

It is an object of the present invention to provide an independent suspension for driven or non-driven wheels in which the toe angle is controlled solely by action of the lower control arm and its related toe correcting link and not by the action of an upper control arm.

It is a further of the invention to provide a suspension arrangement which is relatively insensitive to variations and locations of the upper pivot points with respect to the lower pivot points in terms of the ability to control toe angle during wheel recession.

It is yet another object of the present invention to provide an independent wheel suspension which has the capability of providing toe in during wheel recession including braking and off-throttle operation as well as in response to wheel recession from impacts with obstructions in the roadway.

It is yet another object of the present invention to provide a suspension arrangement having readily adjustable toe control.

SUMMARY OF THE INVENTION

According to the present invention, a suspension system for a motor vehicle comprises a wheel carrier, a roadwheel and tire assembly rotatably mounted to the wheel carrier, a control arm pivoted at a first end to the chassis of the vehicle and pivoted at a second end to the wheel carrier, and means operatively associated with the control arm and responsive to recession of the control arm for displacing the control arm in a manner such that the control arm will urge the wheel carrier in the direction of toe-in when the control arm recesses.

The independent wheel suspension of the present invention is suitable for use with either driven or non-driven wheels of a vehicle. The means operatively associated with the lower control arm to cause toe in in response to recession of the control arm may, for example comprise a toe correcting link pivoted at one end to the chassis and pivoted at the other end to the control arm at a location between its inboard mounting to the chassis and its outboard mounting to the wheel carrier. The suspension according to the present invention may further comprise a telescoping shock absorber mounted between the lower control arm and the chassis of the vehicle as well as the load carrying element which may, for example, comprise a steel spring or air spring mounted between the lower control arm and the chassis. An upper control arm having an inboard end journaled to the chassis and an outboard and journaled to the wheel carrier may also be employed.

The present invention is suitable for use with the known Macpherson strut or modified MacPherson strut configurations as well as with the illustrated short-long arm arrangement.

BRIEF DESCRIPTION OF THE DRAWINGS

FIG. 3 is an enlarged partial section showing the leading inboard end of the lower control arm as well as the toe correcting link of the present invention.

FIG. 4 illustrates the behavior of a transverse control arm suspension during recession without the influence of the toe correcting link of the present invention.

FIG. 5 illustrates the behavior of the suspension of the present invention during recession.

FIG. 6 is a plan view of an alternative embodiment of an independent wheel suspension according to the present invention.

DESCRIPTION OF THE PREFERRED EMBODIMENTS

Figure 1:
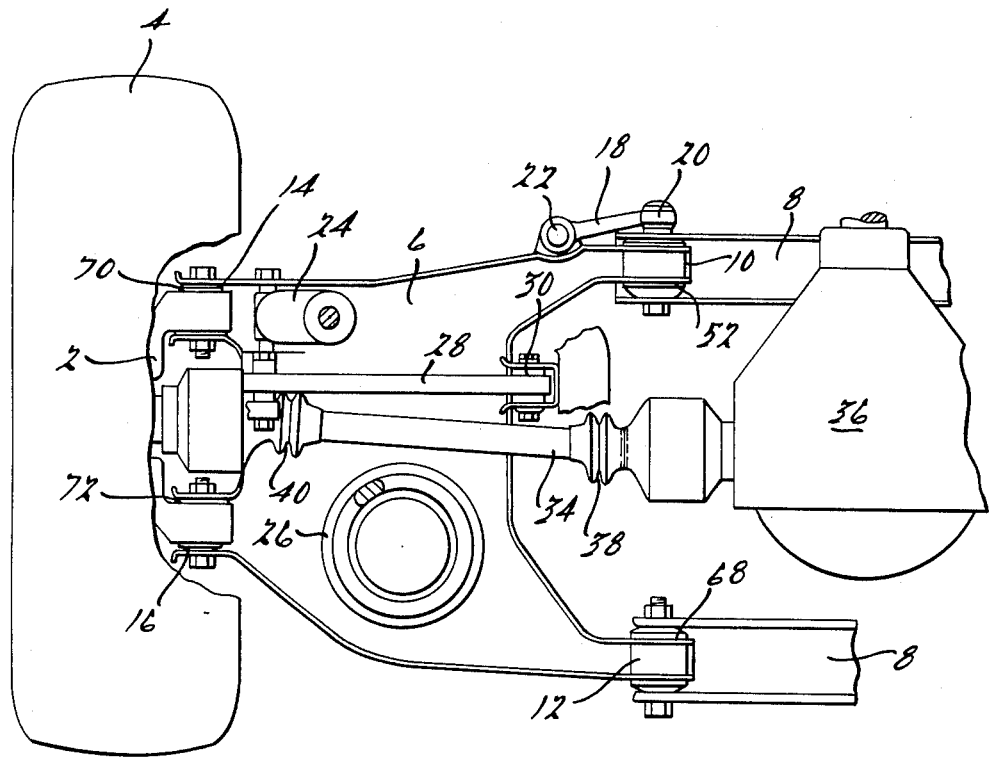
FIG. 1 is a plan view of an independent wheel suspension according to the present invention.
Figure 2:
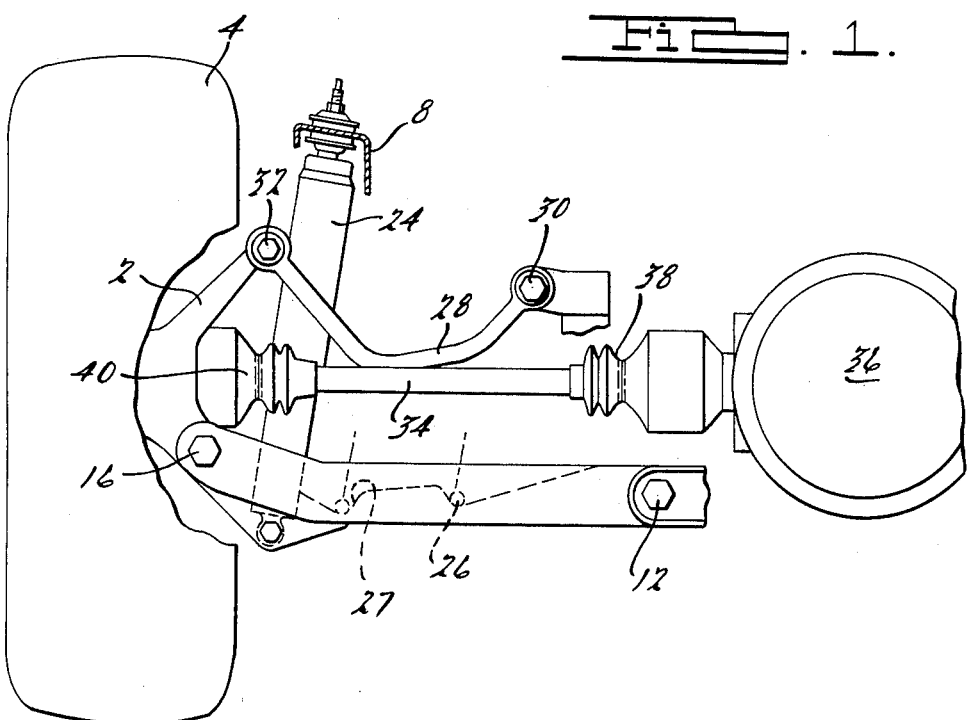
FIG. 2 is a rear elevation of the independent suspension shown in FIG. 1.
Figure 2:
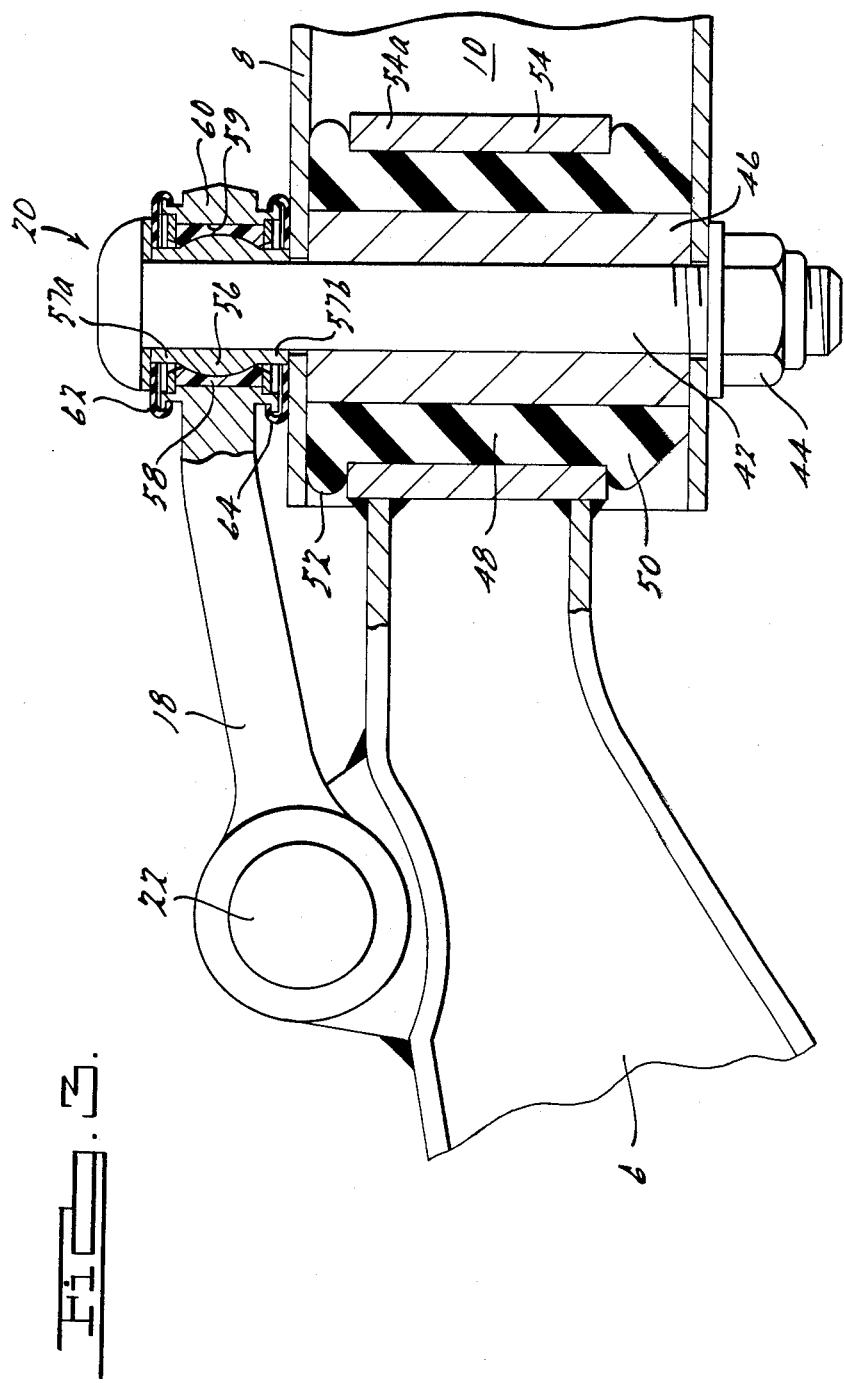

A preferred embodiment of the present invention is shown in FIGS. 1 and 2. Only the driver's side of the suspension is shown, it being understood that passenger side is identical.

Roadwheel and tire assembly 4 is rotatably mounted to wheel carrier 2, which is attached to the chassis by means of control arms. Lower control arm 6 is generally of H-shaped unitary construction and may be formed, for example, of stamped steel. Other constructions are possible such as cast, forged or stamped ferrous of non-ferrous metals, or non-metallic composites. Lower control arm 6 runs generally transversely of the vehicle and is pivoted to chassis 8 in two locations separated longitudinally from each other.

Bushing assembly 10 attaches lower control arm 6 at its leading inboard end to chassis 8 whereas bushing assembly 12 attaches lower control arm to chassis 8 at its trailing inboard end. The lower control arm is attached to wheel carrier 2 at two locations separated longitudinally from each other by bushing assembly 14 at its leading outboard end and bushing assembly 16 at its trailing outboard end. The inner pivot axis of lower control arm 6, which is defined by a line passing through the centers of bushing assemblies 10 and 12 runs generally parallel to the longitudinal centerline of chassis 8. It should be understood in view of this disclosure that lower control arm 6 could be attached to wheel carrier 2 by means of a single longer elastomeric bushing assembly or by two spherical ball joints, or by a single metallic bushing assembly, it being recognized that the connection between the lower control arm and wheel carrier must have two principal attributes. Namely, the ability to allow rotation between these two components about a substantially longitudinal, generally horizontal axis, and the capability to transmit steering forces from the lower control arm to the wheel carrier.

Coil spring 26 is interposed between the chassis and lower control arm 6 and supports the weight ultimately borne by wheel and tire assembly 4. Similarly, telescoping shock absorber 24 is connected between lower control arm 6 and chassis 8 in conventional manner. It should be understood in view of this disclosure that coil spring 26 could be replaced by any other load carrying element known to those skilled in the art such as a pneumatic or hydraulic spring or any combination thereof.

Wheel and tire assembly 4 is driven by differential gear 36 which is operatively connected to wheel and tire assembly 4 by means of half shaft 34 which is coupled to differential gear 36 at its inboard end by constant velocity joint 38 and coupled at its outboard end to the wheel carrier assembly by constant velocity joint 40. Although FIGS. 1 and 2 depict a driven wheel, the suspension described herein may be used equally well with non-driven wheels such as the rear wheels of a front wheel drive automobile.

Upper control arm 28 in the embodiment of the invention shown controls the camber angle of wheel carrier 2. The upper control arm is journaled to the chassis at its inboard end by bushing assembly 30 and journaled at its outboard end to the wheel carrier by bushing assembly 32. Although upper control arm 28 is preferably of stamped steel construction, this arm may be fabricated according to any of the various means known to those skilled in the art such as casting, forging or stamping of ferrous or non-ferrous materials or of any of the known methods for forming such members of non-metallic materials. It should be understood in view of this disclosure that upper control arm 28 and telescoping shock absorber 24 could be replaced by a strut such as a modified MacPherson strut, which could mount coil spring 26 as well.

As shown in FIGS. 1 and 3, toe correcting link 18 is pivoted at its inboard end 20 about the inboard leading pivot of lower control arm 6. Outboard end 22 of toe correcting link 18 is pivoted to the leading edge of lower control arm 6 about an axis extending generally perpendicular to the road surface the vehicle is operating upon. Each end of toe correcting link 18 is identical and is equipped with a ball joint for attachment of the link. As shown in FIG. 3, ball joints 20 and 22 comprise bearing shell bore 59, formed within bearing boss 60. Bearing shell 58, preferably of a low friction material such as the several plastic compositions used for such purposes, is retained within bore 59. Spherical segment 56 having shoulders 57a and 57b rotates within bearing shell 58. Annular boots 62 and 64 attached to the exterior of bearing boss 60 exclude road splash from the interior of the ball joint.

It has been found that the outboard pivot axis of the toe correcting link may be located with good results at a variety of locations lying between the inboard and outboard pivots of the lower control arm. Location of the outboard pivot shown in FIGS. 1 and 3 proximate the leading edge of the lower control arm allows link 18 to be short in length and therefore represents a reasonable placement in terms of the need to conserve materials and weight in automotive construction.

The details of construction of the several elastomeric bushing assemblies used herein will be described with reference to FIG. 3. Thus, for example, outer sleeve 54 welded to the leading inboard end of control arm 6 retains elastomeric bushing 48 which is compressed within sleeve 54. Bushing 48 terminates in the rearward axial direction with conical section 50 which, due to its smaller cross-sectional area, provides a lower axial load rate in the rearward direction for reduced ride harshness. This lower rearward axial bushing rate also allows toe control, as will be explained below. Bushing 48 has an abutting section 52 interposed between the axial termination 54a of outer sleeve 54 and chassis 8. The relatively greater cross-sectional area of this abutted section causes bushing 48 to have a relatively higher axial rate in a forward direction which aids in the prevention of toe-out under acceleration forces. Finally, bushing 48 has a lower radial rate than does bushing 68, the trailing inboard bushing, to allow toe correcting link 18 to override bushing 48 during the toe correcting function. The bushing assembly is completed by inner sleeve 46 which is of cylindrical construction having a bore for pivot bolt 42. Sleeve 46 also functions as a spacer between adjacent abutting walls of chassis 8.

As previously noted, the general construction of each of the suspension bushing assemblies employs an outer sleeve and an interposed generally cylindrical elastomeric bushing which may be tuned in accordance with the suspension designer's objectives.

Recession of the wheel and tire assembly and lower control arm during braking, or off-throttle deceleration, or in the event that the roadwheel and tire assembly strikes an obstruction in the roadway, will be accompanied by the action of the toe correcting link to prevent the roadwheel and tire assembly from toeing out. As will be seen from FIG. 4, recession of a lower control arm having the configuration of the present invention but without a toe correcting link, will be accompanied by a toe out condition as shown in the broken lines of FIG. 4. If, however, a toe correcting link according to the present invention is employed, recession of the lower control arm will, as shown in FIG. 5, be accompanied by toe in, or at least an absence of toe out because the toe correcting link, in response to recession of the control arm, will steer the arm in the direction of toe in and having done so, the control arm will in turn displace or urge the wheel and tire assembly in the direction of toe-in. This displacement of the lower control arm in a toe in direction by the toe correcting link results because movement of the lower control arm in recession causes toe correcting link 18 to pivot rearward about inboard ball joint 20 and this rearward rotation of the toe correcting link occurs on such an arc that outboard ball joint 22 has an inboard component of movement toward the longitudinal center line of the vehicle; this inboard movement displaces lower control arm 6 in such a manner that it will rotate in a horizontal plane about trailing inboard end 12 as leading inboard end 10 and indeed, the entire arm, moves in response to the rearward rotation of the toe correcting link. The toe correcting link thus functions as separate means responsive to recession of the lower control arm for displacing or rotating the control arm in a horizontal plane during braking and off-throttle operation such that the control arm will urge the wheel carrier in the direction of toe in. Because lower control arm 6 rotates about trailing inboard pivot 12, its motion at the leading inboard pivot is transverse to the vehicle and this transverse motion compresses bushing 48 radially.

Operation of the suspension system of the present invention is affected by the tuning of the various suspension bushings as follows. As noted above, the leading inboard bushing 48 of the lower control arm must have a higher axial rate in the forward direction to prevent toe out under acceleration and a somewhat lower axial rate in the rearward direction for reduced ride harshness and to allow recession necessary for the operation of the toe correcting link. Operation of the toe correcting link also requires that leading inboard bushing 48 have a lower radial rate than does trailing inboard bushing 68 in order that the forces imposed by the toe correcting link during recession will cause lower control arm 6 to pivot about trailing inboard bushing 68 rather than merely causing control arm 6 to move inboard radially against the trailing inboard bushing. Trailing inboard bushing 68 must also have a rearward axial rate which is lower than its forward axial rate for the reasons cited above with respect to the leading inboard bushing. The outboard bushings 70 and 72 must have very high radial rates to allow lower control arm 6 to displace the wheel and tire assembly in the toe in direction at such time as lower control arm 6 is urged in the toe in direction by operation of the toe correcting link. Because the degree of toe in is thus related to the rates of the various bushings employed in the present system, the operating characteristic of the system may readily be adjusted by simply substituting new bushings having appropriate rates in the place of previously existing bushings. For example, if testing discloses that over-correction of toe angle is occurring, the radial rate of leading inboard bushing 48 may be increased. This will have the effect of reducing the degree to which lower control arm 6 is caused to rotate in a horizontal plane during wheel recession and will thus result in a lesser correction of toe angle. In the event that the motion imparted by the toe correcting link to the lower control arm is not adequately transmitted to the wheel carrier, the radial rates of the outboard bushings 70 and 72 may be increased. It should be understood that with the exception of the lower control arm's leading inboard bushing, each of the bushing assemblies described herein could be replaced by alternate assemblies such as spherical ball joints.

FIG. 6 illustrates an alternate embodiment of the present invention in which the inner pivot axis of lower control arm 6 defined by a line passing through pivots or bushing assemblies 10 and 12 forms an acute angle with the longitudinal centerline of chassis 8. The embodiment shown in FIG. 6 differs from the previously described embodiment in another regard inasmuch as the toe correcting link 19 is journaled to the trailing end of leading inboard bushing assembly 10 and journaled to lower control arm 6 at a position which is longitudinally between the inboard ends of the control arm. A second major difference resides in the use of an additional toe correcting link 74 pivoted to other lower control arm's trailing inboard pivot. Link 74 is constructed in similar fashion to link 18, with ball joints 76 and 78 at either end and functions to control toe angle during wheel recession, but unlike link 18 which displaces the control arm inward against the resistance of the leading inboard bushing assembly, link 74 displaces lower control arm 6 outboard, so as to urge the wheel carrier in the direction of toe in. This second toe correcting link may be employed with the previous embodiment as well.

The suspension arrangement of the present invention is ideally suited for use with mass produced vehicles comprising stamped sheet metal subassemblies welded into a conventional unitized construction as well as conventional separate frame and body type construction. It is known to those skilled in the art of stamping and welding sheet metal body assemblies that dimensional changes in stamped parts can result due to the intervention of time and tool wear. These changes may result in loss of the desired "design" location for various hard points for mounting suspension members. The present suspension presents a solution to this problem of dimensional instability because this suspension is relatively insensitive to variations in the location of the pivot point of the upper control arm with respect to the pivot points of the lower control arm. This insensitivity flows directly from the fact that the toe control maintained by the present suspension results totally from the operation of the lower control arm and the toe correcting link; the upper control arm is used to control only the camber angle of the wheel carrier. The functional integrity of the present system is further enhanced by virtue of the fact that the toe correcting link is mounted such that it will automatically track any changes in the static, or at rest, location of the lower control arm. More specifically, should the location of the lower control arm change slightly during a production run, the toe correcting link will also change location in precisely the same manner because the outboard end of the toe correcting link is mounted to the control arm itself and the inboard end is mounted to the control arm's inboard leading pivot. Of further significance is the fact that the vehicle will maintain a stable operating attitude even should the toe correcting link fail to function, or even should the toe correcting link become disconnected from either of its pivots. Other designs using discrete control arms to control toe angle will suffer complete loss of wheel control in the event that one suspension link fails. The present system will continue to operate in the absence of a functioning toe correcting link as a conventional suspension which allows the wheel and tire assembly to toe out during braking, and off-throttle operation. Although this toe out phenomenon is undesirable, it will not cause the vehicle to operate in an unsafe manner.

Although the present system has been described for use with a discrete load carrying device such as a spring and a separate upper control arm, the system of the present invention is equally useful with the known Mac-Pherson strut type of suspension.

The toe correcting link and lower control arm arrangement of the present invention can beneficially be used to control toe angle during wheel recession such that the desired toe angle is achieved. In this regard it should be noted that the various suspension bushings can be tuned to produce toe in, or alternatively, to merely prevent toe out during wheel recession.

When used herein, the term "chassis" means conventional automotive chassis as well as conventional unitized automotive body structures.

Variations and modifications of the present invention are possible without departing from the spirit and scope of the invention as defined by the appended claims.

I claim:

1. A suspension system for motor vehicle comprising:
    a wheel carrier;
    a roadwheel and tire assembly rotatably mounted to said wheel carrier
    a control arm pivoted at one end to the chassis of said vehicle at two locations separate longitudinally from each other and pivoted at a second end to said wheel carrier at two locations separated longitudinally from each other; and
    means operatively associated with said control arm and responsive to recession of said control arm for displacing said control arm such that said control arm will urge said roadwheel and tire assembly in the direction of toe-in, with said means causing said control arm to rotate in a horizontal plane about one of said pivots connecting said control arm to said chassis, while moving transversely with respect to the other of said pivots connecting said control arm to said chassis.

2. A suspension system for a motor vehicle comprising:
    a wheel carrier;
    a lower control arm with leading and trailing inboard ends pivoted to the chassis of said vehicle and leading and trailing outboard ends pivoted to said wheel carrier;
    a roadwheel and tire assembly rotatably mounted to said wheel carrier; and
    separate means responsive to recession of said control arm for rotating said control arm in a horizontal plane during braking and off-throttle operation such that said control arm will urge said wheel carrier in the direction of toe in, with said means for rotation said control arm comprising a toe correcting link pivoted at one end to said chassis and pivoted at the other end to said control arm at a location intermediate said outboard and inboard ends of said control arm.

3. A suspension system for a motor vehicle comprising:
    a wheel carrier;
    a lower control arm with leading and trailing inboard ends pivoted to the chassis of said vehicle and leading and trailing outboard ends pivoted to said wheel carrier;
    a roadwheel and tire assembly rotatably mounted to said wheel carrier; and
    separate means responsive to recession of said control arm for rotating said control arm in a horizontal plane during braking and off-throttle operation such that said control arm will urge said wheel carrier in the direction of toe in, wherein said means for rotating said control arm comprises first and second toe correcting links, with each of said links having one end pivoted to the chassis of the said vehicle and a second end pivoted to said control arm at a position intermediate said inboard and outboard ends of said control arm.

4. The suspension system according to claim 2 wherein the inboard pivot of said toe correcting link is mounted to said chassis about the pivot axis of one of said inboard ends of said lower control arm.

5. The suspension system according to claim 3 wherein the inboard pivot of said toe correcting link is positioned at the leading pivot of said lower control arm.

6. The suspension system according to claim 5 wherein the outboard pivot of said toe correcting link is positioned such that the leading inboard end of said lower control arm will be urged to move toward the centerline of said vehicle during wheel recession.

7. The suspension system according to claim 6 wherein the outboard pivot of said toe correcting link is proximate the leading edge of said lower control arm.

8. The suspension system according to claim 6 wherein the outboard pivot of said toe correcting link is located in a position which is longitudinally between the inboard ends of said lower control arm.

9. A suspension system for a motor vehicle comprising:
- a wheel carrier;
- a unitary transverse lower control arm with leading and trailing inboard ends pivoted to the chassis of said vehicle and leading and trailing outboard ends pivoted to said wheel carrier;
- a roadwheel and tire assembly rotatably mounted to said wheel carrier;
- a telescoping shock absorber mounted between said lower control arm and said chassis;
- a load carrying element mounted between said lower control arm and said chassis; and
- an upper control arm having an inboard end pivoted to said chassis and an outboard end pivoted to said wheel carrier; and
- a toe correcting link equipped with a ball joint at either end, with one of said joints attached about the axis of the inboard leading pivot of said lower control arm and the other of said ball joints attached to said lower control arm at such a location that said toe correcting link will rotate said lower control arm so as to urge said wheel carrier in the direction of toe in when said lower control arm recesses.

10. The suspension system according to claim 9 wherein said load carrying element comprises a steel spring.

11. The suspension system according to claim 9 wherein said load carrying element comprises a fluid spring.

12. The suspension system according to claim 9 wherein said toe correcting link rotates said lower control arm in a horizontal plane when said lower control arm recesses.

13. The suspension system according to claim 9 further comprising a second toe correcting link equipped with a ball joint at either end, with one of said joints attached about the axis of the inboard trailing pivot of said lower control arm and the other of said ball joints attached to said lower control arm at such a location that both of said toe correcting links will rotate said lower control arm in the direction of toe in when said lower control arm recesses.

14. The suspension system according to claim 9 wherein said leading and trailing outboard ends of said lower control arm are pivoted to said wheel carrier by means of elastomeric bushing assemblies.

15. The suspension system according to claim 9 wherein said leading and trailing inboard ends of said lower control arm are pivoted to said chassis by means of bushing assemblies, with the leading bushing assembly having a lower radial rate than the radial rate of said trailing bushing assembly.

16. The suspension system according to claim 13 wherein said toe correcting link rotates said lower control arm in a generally horizontal plane about its trailing inboard end against radially directed resistance of the elastomeric bushing assembly located at the leading inboard end of said lower control arm.

* * * * *